June 6, 1961  B. H. BARD  2,987,041

FEEDING STATION FOR WILD BIRDS

Filed Feb. 5, 1959

INVENTOR
BRUCE H. BARD

BY Robert V. Morse

ATTORNEY de# United States Patent Office 2,987,041
Patented June 6, 1961

2,987,041
FEEDING STATION FOR WILD BIRDS
Bruce H. Bard, 3322 Slaterville Road, Brooktondale, N.Y.
Filed Feb. 5, 1959, Ser. No. 791,385
4 Claims. (Cl. 119—52)

This invention relates to feeding stations for wild birds and is particularly adapted to fill the requirements of bird lovers who wish to help the smaller birds obtain food when the weather or other unfavorable conditions make it difficult for them to survive. If food is merely put in an accessible place, it is often quickly consumed by the larger and more aggressive birds as well as by squirrels, mice and other scavengers, so that the more desirable birds receive little benefit. Another problem is to provide an adequate and self-feeding supply which can be readily replenished even when the device is hung from a bracket or branch to protect it. Other objects of the invention are to make a durable and practical appartus of light weight yet having stability in a wind, and capable of being marketed in a relatively small package yet requiring no assembly of its parts to put it into use. The feed for the birds can be obtained in disposable re-fill containers, making it a simple matter to maintain an ample supply of proper food under cleanly and sanitary conditions; and as the food is eaten the supply is automatically replenished. Further objects will become apparent as the description proceeds.

Referring now to the drawings forming part of this specification,

Similar reference numerals refer to similar parts thruout the various views.

Figure 1:
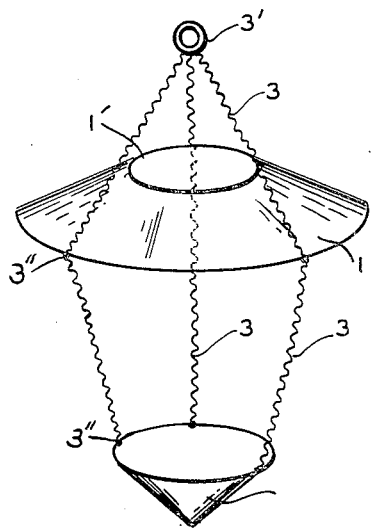
FIG. 1 is a general perspective view of the exterior framing assembly with the central feed supply container removed.

Referring now to FIG. 1, which shows the exterior frame of the bird feeding apparatus, the upper or protective element consists of a relatively large, downwardly sloping umbrella, roof or protective canopy 1 to shelter the smaller feed pan 2 which is suspended below it on the chains or cords 3. These terminate above in a suspension member preferably including a ring 3' by which the entire apparatus may be hung from a bracket or a tree. The suspending members or chains 3 are preferably attached as at 3" to the canopy 1 and feed pan 2 near their respective peripheries. Since the canopy is larger than the pan, the suspending chains 3 converge somewhat inwardly toward the pan 2 which is thereby given some lateral stability that it would not have if the chains were parallel.

The canopy 1 slopes down so that rain or snow can run off and is made considerably larger than the feeding pan 2 so as to protect the food that may accumulate in the pan and shelter the birds while eating it. The cover 1 and the pan 2 are preferably made of aluminum or other durable and non-rusting material having a hard, smooth surface, sufficient for small birds to stand on but offering scant support and a poor foothold for the claws of squirrels, mice and larger birds. The combination has no rigid backbone or fixed structure for compression stresses and hence is unstable to heavier birds or substantial eccentric loads.

Figure 2:
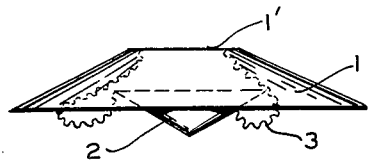
FIG. 2 is a similar view of the apparatus of FIG. 1 shown in a collapsed or compacted condition for packaging and shipment.

Since the connecting elements 3 are all chains or cords, structural framing elements 1 and 2 can be collapsed as shown in FIG. 2 so as to readily fit into a small box or package for sale, and they are not liable to damage by careless handling.

Figure 4:
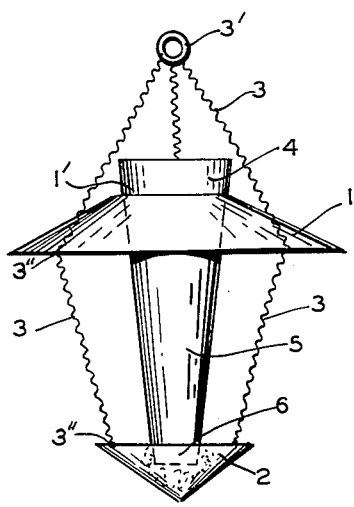
FIG. 4 is an elevation view in perspective showing the assembled device in use, with the automatic flow of feed from the inverted container serving to stabilize the lower pan and the entire assembly, so that the apparatus can operate in a wind or when hanging from a branch.
Figure 3:
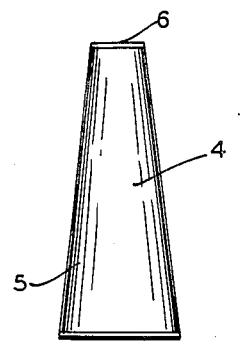
FIG. 3 is an elevation view of the feed container unit, which may be of a disposable type, filled and marketed from a regular store.

The feed container 4 as shown in FIG. 3 is generally tapered or conical in shape and higher than its diameter. Such a container 4 has in general a body 5 and a smaller neck or orifice 6 thru which the food may run. The container 4 when in use extends downward thru the opening 1' of the canopy 1. This container 4 may be of waterproof paper composition or plastic similar to the disposable containers used for fruit juice, milk and other fluids; and can be sold by the bird stores filled with the proper seeds and other bird feed so that a good supply of food for the birds will always be available. Such containers, being waterproof, will generally last a long time, and can be refilled if desired by the user of the feeding station instead of purchasing re-fills. When inverted in operation as shown in FIG. 4, the opening or neck 6 of the container 4 should be smaller than the body 5 and should terminate above the central floor of the feed pan 2, leaving an ample space for a flow of seeds.

The fact that the neck 6 of the container 4 does not touch the floor of the feed pan 2 is important for various reasons. Not only does it insure a flow of feed to replace that consumed by the birds, but it also stabilizes the entire apparatus against winds and the impacts of squirrels and the larger birds. It provides a certain amount of coheret stability that permits the apparatus to continue to operate as a unit. While the cover 1 is only connected to the feed pan 2 by yieldable cords or chains having no lateral rigidity (their strength being only in tension so that without food the pan 2 would flap in the wind), in actual operation the nose of the feed container 6 is partly buried in a pile of seeds, somewhat as it would be in loose sand. This absorbs shocks and stabilizes the entire structure so that the pan 2 is not really independent of the cover 1 into which the larger end of the container 1 fits securely. Such stability continues automatically as long as there is feed in the container. After that, any lack of stability is immaterial; in fact, the feed pan 4 blowing around serves as an indicator that a new supply of food is required.

To fill the apparatus from a new container, it is desirable to avoid loss of feed from its open spout until after the container is securely in place. That can easily be accomplished without spilling, if the person takes the following steps.

Figure 5:
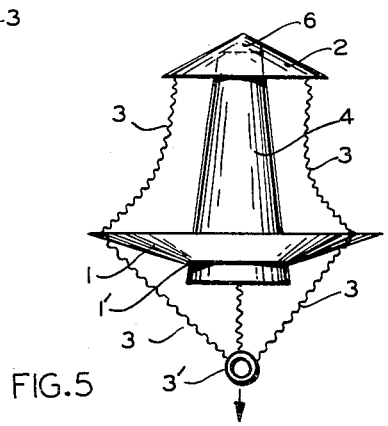
FIG. 5 illustrates a convenient method for re-filling the device with a new container of bird feed without spilling.

First set the feed container 4 on a flat surface such as a table and remove the cap so that the container is open. Then take the bird feeder assembly 1, 2 and 3 illustrated in FIG. 1 and FIG. 2, turn it upside down as shown in FIG. 5, and let it slip down over and around the feed container 4. Since the opening 1' in the canopy 1 is smaller than the wider part of the container 4, the large cover 1 will not touch the table but will be wedged on the container 4 while the feed pan 2 rests on the top of the neck or spout 6.

Then pick up the entire loaded feeding station as shown in FIG. 5, hold the suspension chains 3 taut by pulling down on the ring 3', and quickly turn the whole assembly right side up. The apparatus is then ready to be hung in any suitable place to attract birds, as shown in FIG. 4. When it is thus hung in its normal operating position, the feed pours down into the lower pan 2 where the partially embedded neck or spout 6 makes it sufficiently rigid for the desired birds to use it.

While I have in the foregoing described certain specific forms by way of example, it will be understood that they are merely for the purpose of illustration to make clear the principles of the invention, which is not limited to the particular forms shown, but is susceptible to various modifications and adaptations in different installations as will be apparent to those skilled in the art, without departing from the scope of the invention as stated in the following claims.

I claim:

1. In a feeding station for birds, the combination of a feed pan on which birds may alight, a canopy of larger spread than the pan, said canopy having an opening therein adapted to hold a feed container, laterally flexible tension members connecting the outer portions of the canopy and feed pan so as to support the pan under the shelter of the canopy, said tension members being so spaced as to render their support of the feed pan relatively unstable for larger birds, whereby smaller birds may be favored.

2. In a feeding station for birds, the combination of a feed pan on which birds may alight, a canopy of larger spread than the pan, said canopy having an opening adapted to hold a feed container over the pan, a gravity operated self-feeding feed container fitting in said opening and having a spout extending downward to within a short distance of the pan but spaced from the pan so as to maintain a pile of feed with the spout touching the same to thereby help stabilize the pan, laterally flexible tension members connecting the canopy and feed pan so as to support the pan under the shelter of the canopy at the location relative to the spout as above stated.

3. In a feeding station for birds, the combination of a feed pan on which birds may alight, a canopy of larger spread than the pan, said canopy having an opening adapted to hold a feed container over the pan, laterally flexible tension members connecting the canopy and feed pan so as to support the pan under the shelter of the canopy, said supporting members being so spaced as to render their support of the feed pan relatively unstable for larger birds whereby small birds may be favored, a conical feed container inverted in said opening of the canopy and having a spout extending downward toward the feed pan but spaced therefrom so as to maintain a pile of feed therein for the birds, said pile also serving to help hold the pan in proper location under said spout.

4. In a feeding station for birds, the combination of a feed pan in the form of an inverted cone on the rim of which birds may alight, said pan being supported by three chains attached near its periphery, a sheltering canopy for said pan, said canopy being in the form of the frustum of a cone so as to have a central opening therein, a tapered feed container having a base sufficiently larger than said opening so that it is thereby held in place when inverted therein, said container having a spout and its length being sufficiently shorter than the distance to the feed pan so that feed will flow to maintain a pile therein and also steady the pan relative to the spout and canopy.

References Cited in the file of this patent

UNITED STATES PATENTS

| | | |
|---|---|---|
| 1,749,497 | McGlashan | Mar. 4, 1930 |
| 2,786,446 | Newman | Mar. 26, 1957 |